United States Patent
Taljaard

(10) Patent No.: US 9,487,185 B2
(45) Date of Patent: Nov. 8, 2016

(54) VEHICLE ALARM SYSTEM

(71) Applicant: Philippus Petrus Erasmus Taljaard, Nelspruit (ZA)

(72) Inventor: Philippus Petrus Erasmus Taljaard, Nelspruit (ZA)

(*) Notice: Subject to any disclaimer, the term of this patent is extended or adjusted under 35 U.S.C. 154(b) by 2 days.

(21) Appl. No.: 14/631,000

(22) Filed: Feb. 25, 2015

(65) Prior Publication Data
US 2016/0090064 A1  Mar. 31, 2016

(30) Foreign Application Priority Data
Sep. 30, 2014 (ZA) .................. 2014/07102

(51) Int. Cl.
| | | |
|---|---|---|
| *B60R 25/10* | (2013.01) | |
| *B60R 25/102* | (2013.01) | |
| *B60R 25/104* | (2013.01) | |
| *B60R 25/33* | (2013.01) | |

(52) U.S. Cl.
CPC ......... *B60R 25/1009* (2013.01); *B60R 25/101* (2013.01); *B60R 25/102* (2013.01); *B60R 25/104* (2013.01); *B60R 25/33* (2013.01)

(58) Field of Classification Search
CPC .............. B60R 25/10; B60R 25/1001; B60R 25/1003
USPC ............ 340/426.1, 426, 22, 426.24, 426.25, 340/426.29, 426.37, 438
See application file for complete search history.

(56) References Cited

U.S. PATENT DOCUMENTS

| | | | | |
|---|---|---|---|---|
| 4,531,116 | A * | 7/1985 | Takagi ................. | B62D 43/10 340/457 |
| 6,561,489 | B1 * | 5/2003 | Wakefield ............ | B62D 43/045 224/42.23 |
| 2004/0124223 | A1 * | 7/2004 | Riemer ................. | B62D 43/02 224/509 |
| 2013/0293712 | A1 * | 11/2013 | Turner .................... | B60R 1/00 348/148 |

* cited by examiner

*Primary Examiner* — Kevin Kim
(74) *Attorney, Agent, or Firm* — Osha • Liang LLP

(57) ABSTRACT

A vehicle alarm system 10 includes a control unit 12, a number of door contacts or switches 13, 14, 15 connected as inputs to the control unit 12, the switches including a spare wheel sensor 14 and a battery sensor 15, and a spare wheel locking mechanism 16 connected to the control unit 12 as an output amongst others. The locking mechanism 16 has an actuator in the form of an electric motor 36 which is configured slideably to displace a locking pin 37 between an open position and a closed position in which the pin 37 engages a spare wheel hoist 26 of the vehicle hence preventing unauthorized lowering/removal of the spare wheel. If the alarm is armed, the sensor 14 will detect when an attempt is made to loosen the wheel and in response thereto a siren 19 will be sounded and the locking mechanism 16 locked.

17 Claims, 4 Drawing Sheets

VEHICLE ALARM SYSTEM

FIELD OF INVENTION

This invention relates to a vehicle alarm system and to a vehicle wheel locking mechanism.

The Inventor has noticed that externally mounted spare wheels and batteries of vehicles are susceptible to theft. In many instances spare wheels are not locked to the vehicle, which means they can be removed at will by anyone, making them highly susceptible to theft. If the spare wheel is locked, this is generally achieved by way of a padlock and key or some other manually operated lock. These locks are susceptible to tampering, however, and can easily be cut using a bolt cutter or other suitable tools. A vehicle owner may also not necessarily be aware when an attempt is being made to steal his spare wheel or, even worse, may only learn of the fact that his spare wheel has been stolen when the need arises to use it. This is particularly prevalent in pickup trucks or "bakkies" where the spare wheel is mounted below a loadbin of the truck, out of sight.

It is an object of the invention to provide a warning/alarm system and locking mechanism which address or alleviate the abovementioned problems.

SUMMARY OF INVENTION

In the context of this specification, the term "vehicle" should not be understood to refer only to motor vehicles (cars) but includes land-based and airborne vehicles.

In accordance with a first aspect of the invention, there is provided a vehicle alarm system which includes:
  an electronic control unit;
  a spare wheel locking mechanism which is operatively mounted to a vehicle and which is communicatively linked to the control unit, the locking mechanism including a locking member which is configured to lock a spare wheel mounted to the vehicle in place hence preventing unauthorised removal of the spare wheel; and
  a spare wheel sensor which is communicatively linked to the control unit, the sensor being configured to detect when the spare wheel mounted to the vehicle is disengaged from the vehicle and to communicate this to the control unit, in response to which the control unit is configured to trigger an alarm and/or engage the locking member in order to lock the spare wheel in place, if need be.

The spare wheel locking mechanism may further include an actuator which is communicatively linked to the control unit and drivingly connected to the locking member, the locking member being movable between an open position in which the spare wheel is permitted to be removed from the vehicle and a closed or locked position in which the locking member prevents removal of the spare wheel from the vehicle, wherein the actuator is configured to move the locking member between its open and closed positions in response to receipt of a control signal from the control unit.

The locking member may be in the form of a spring-loaded locking pin.

The actuator may be in the form of an electrical motor and the locking mechanism may include a worm gear. The motor may be drivingly connected to the worm gear and the locking pin may be at least partially held captive within a pin guide and may include a longitudinal body and an arm which extends laterally away from the body and engages the worm gear such that upon actuation of the motor, the worm gear is configured slideably to displace the locking pin relative to the pin guide from one position to another.

The alarm system may include a battery sensor which is communicatively linked to the control unit and is operatively connected to, or connected proximate to a battery mounting bracket and/or a battery, the sensor being configured to detect whether or not the battery is mounted to the bracket and to communicate this to the control unit.

The spare wheel sensor may be in the form of a mechanical pressure switch.

The alarm system may further include a rear-view camera, activation of the alarm including activation of the rear-view camera in order to provide an occupant of the vehicle with a view of the rear of the vehicle.

In accordance with another aspect of the invention, there is provided a vehicle wheel locking mechanism which is operatively mounted to a vehicle having at least one wheel externally mounted, the locking mechanism including:
  an electrically operated actuator; and
  a locking member which is moveable between an open position in which the wheel is permitted to be removed from a wheel mounting of the vehicle and a closed or locked position in which the locking member prevents removal of the wheel from the wheel mounting, wherein the actuator is drivingly connected to the locking member and configured to move the locking member between its open and closed positions in response to receipt of a control signal originating either from a vehicle alarm system or from a wheel sensor.

The wheel may be a spare wheel and the control signal may be in the form of an electrical signal.

The locking member may be in the form of a spring-loaded locking pin which is configured to engage a spare wheel hoist, locking the hoist in position when the locking pin is in its closed position.

The actuator may be in the form of an electrical motor and the locking mechanism may include a worm gear. The motor may be drivingly connected to the worm gear and the locking pin may be at least partially held captive within a pin guide and may include a longitudinal body and an arm which extends laterally away from the body and engages the worm gear such that upon actuation of the motor, the worm gear is configured slideably to displace the locking pin relative to the pin guide from one position to another.

The invention further extends to a spare wheel hoist including:
  a locking mechanism which includes:
    an actuator; and
    a locking member which is movable between an open position in which the hoist is permitted to raise/lower a spare wheel mounted thereto and a closed or locked position in which the locking member engages a hoisting mechanism of the hoist and prevents raising/lowering of the spare wheel, wherein the actuator is drivingly connected to the locking member and is configured to move the locking member between its open and closed positions in response to receipt of a control signal originating either from a vehicle alarm system or from a wheel sensor.

The actuator may be an electrically operated actuator and the locking mechanism may include a worm gear. The actuator may be drivingly connected to the worm gear and the locking member may be at least partially held captive within a guide and may include a longitudinal body and an arm which extends laterally away from the body and engages the worm gear such that upon actuation of the actuator, the worm gear is configured slideably to displace the locking member relative to the guide from one position to another.

In accordance with yet another aspect of the invention, there is provided a method of modifying a vehicle alarm system, the method including:

retrofitting a spare wheel sensor to the vehicle on or in close proximity to a spare wheel carrier of the vehicle;

communicatively coupling an output of the spare wheel sensor to the alarm system of the vehicle;

retrofitting a spare wheel locking mechanism to the vehicle by mounting the locking mechanism adjacent to a spare wheel hoist of the vehicle, the locking mechanism including an actuator and a locking member, the actuator being drivingly connected to the locking member; and communicatively coupling the actuator of the locking mechanism to the alarm system of the vehicle.

The method may include:

retrofitting a battery sensor to the vehicle on or in close proximity to a battery mounting bracket and/or a battery of the vehicle; and communicatively coupling an output of the sensor to the alarm system of the vehicle.

The sensor may be in the form of a switch. Furthermore, the sensor may be in the form of a mechanical pressure switch. The pressure switch may be spring-loaded. The switch may also be in the form of an electronic pressure switch.

Alternatively, the sensor may be in the form of a magnetic switch, for example a reed switch. The switch may be in the form of a contact switch.

The alarm system may include an activation/deactivation switch which is accessible from the inside of the vehicle.

Provided that the vehicle is fitted with a rear-view camera, activation of the alarm system may include activation of the rear-view camera in order to provide an occupant of the vehicle with a view of the rear of the vehicle.

BRIEF DESCRIPTION OF DRAWINGS

The invention will now be further described, by way of example, with reference to the accompanying diagrammatic drawings.

In the drawings.

DETAILED DESCRIPTION OF AN EXAMPLE EMBODIMENT

Figure 1:
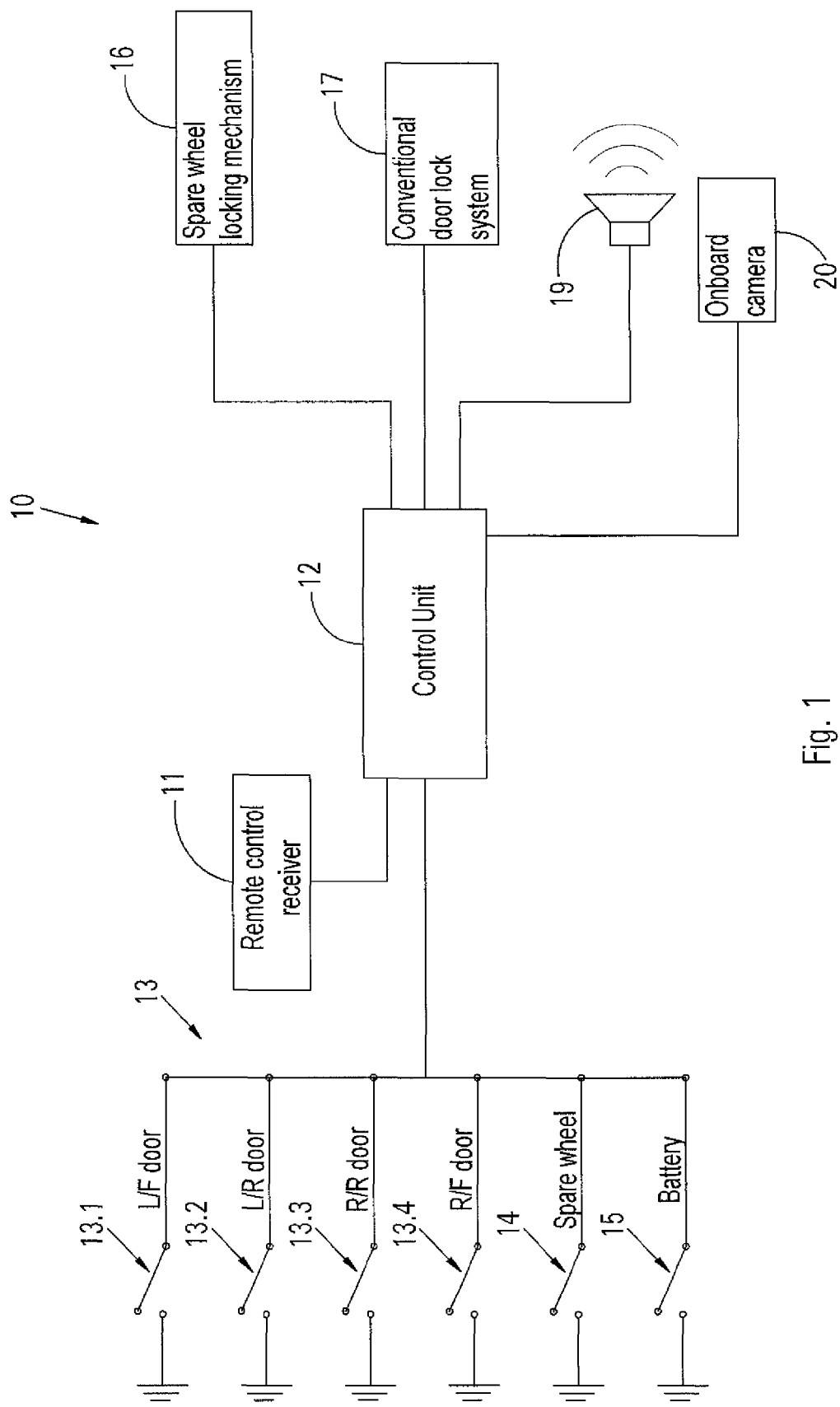
FIG. 1 shows a schematic block diagram of a vehicle alarm system in accordance with the invention.

In FIG. 1, reference numeral 10 refers generally to a vehicle alarm system in accordance with the invention. The alarm system 10 comprises a control unit 12 or central processing unit and a plurality of inputs and outputs which are communicatively linked to the control unit 12 by way of electrical wires.

The inputs include a plurality of electrical door contacts or switches 13 which are connected in parallel. The switches 13 have been illustrated in their open conditions with one contact end of each switch 13 being grounded. The other contact end is connected to the control unit 12. The switches 13 comprise a left front door switch 13.1, a left rear door switch 13.2, a right rear door switch 13.3 and a right front door switch 13.4. The inputs further include a spare wheel sensor in the form of a mechanical pressure switch 14 and a battery sensor also in the form of a mechanical pressure switch 15 and finally a remote control receiver 11. Each of the switches 13 is in the form of a conventional mechanical contact switch although other suitable switches may also be used.

As outputs the system 10 has a spare wheel locking mechanism 16, a conventional door lock system 17, a siren 19 and an onboard camera 20.

Figure 2:
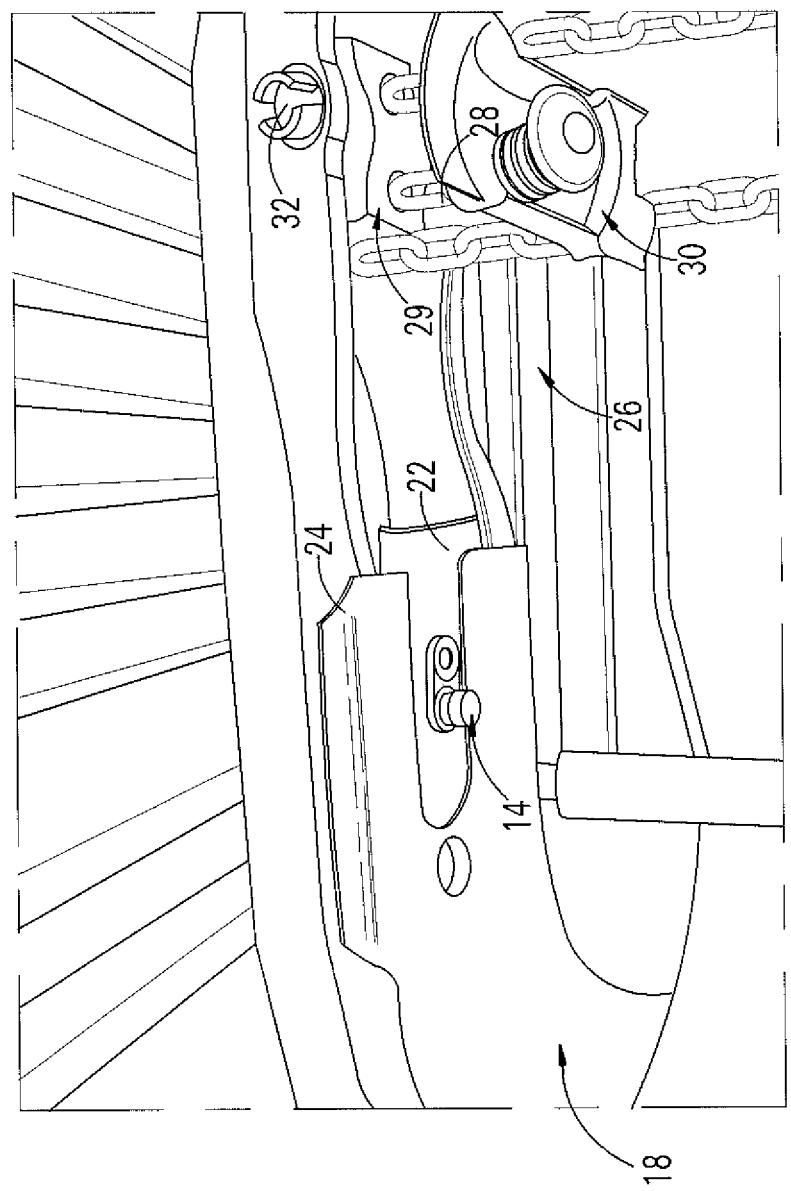
FIG. 2 illustrates a three-dimensional view from below of part of a spare wheel carrier positioned below a loadbin of a pickup truck or bakkie, a spare wheel being removed.

FIG. 2 illustrates an example embodiment of the switch 14 mounted to a plate 22 which in turn is mounted to a frame 24 of a spare wheel carrier 18 of a pickup truck or "bakkie". Typically a spare wheel of a pickup truck is mounted behind the rear axle, underneath a loadbin of the truck in a circular cavity defined by the wheel carrier 18. A spare wheel hoist is illustrated by numeral 26 in FIG. 2 and includes a chain 28 which passes over a pulley or chain guide 31 (see FIGS. 3 and 4) housed within a pulley block 29 which is mounted to a chassis of the truck. A hook or retaining plate 30 is attached to an end of the chain 28 and operatively seats against a rim of the spare wheel. The spare wheel hoist 26 further includes a hoist spanner engaging formation 32 which is connected to the chain guide 31 and protrudes through the pulley block 29. The spanner engaging formation 32 is configured to receive a hoist spanner (not shown) which is used to raise/lower the hook 30 by rotation of the chain guide 31.

Figure 3:
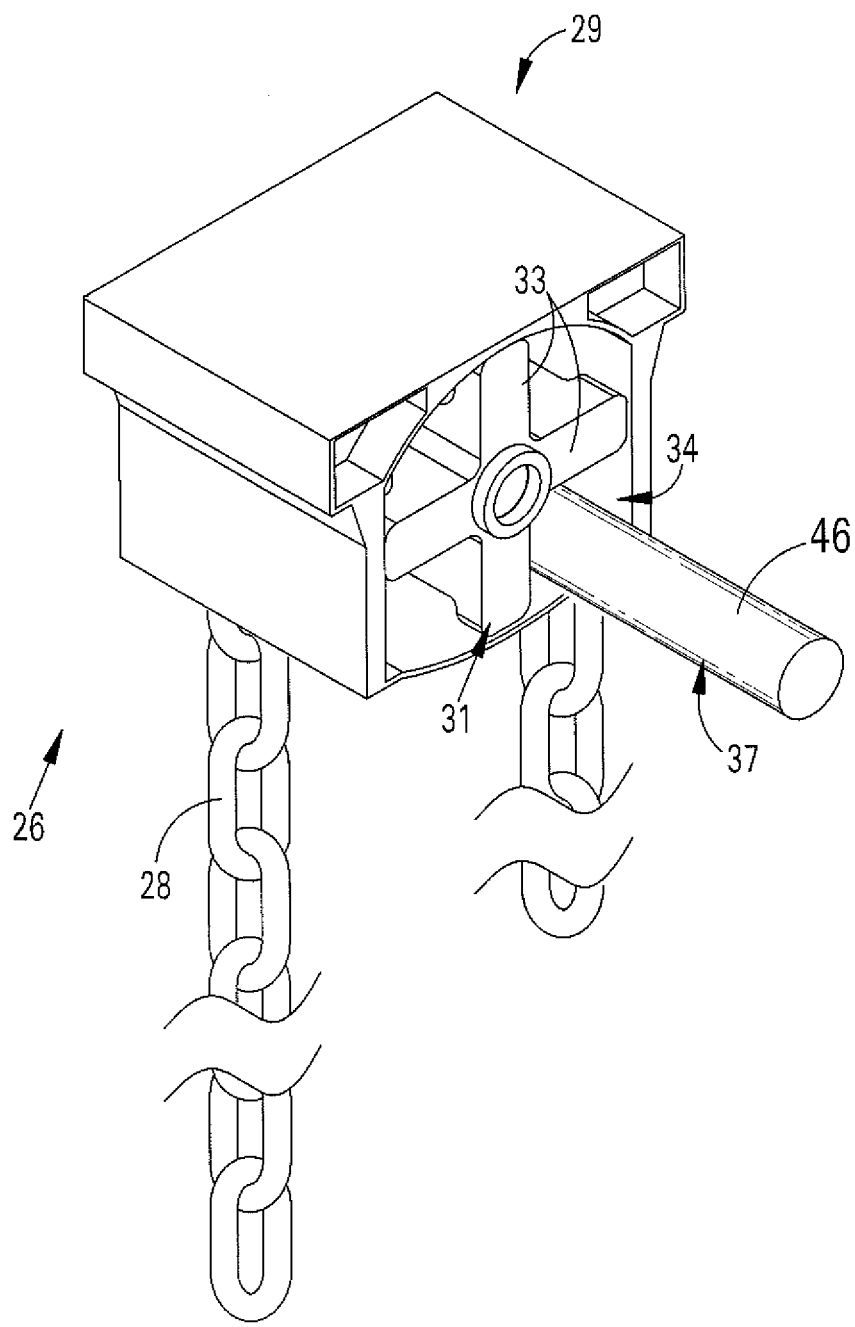
FIG. 3 shows a three dimensional front view of a pulley block and chain illustrated in FIG. 2, on an enlarged scale.

With reference to FIG. 3, the chain guide 31 has four angularly spaced apart, radially extending arms 33 which define openings 34 therebetween.

When the spare wheel is in a stowed position in which it abuts the carrier 18, a side wall of the wheel depresses and opens the switch 14. Hence, when the spare wheel is removed, or even just slightly spaced away from the frame 24, the switch 14 will close due to an internal spring and the control unit 12 will detect that the switch 14 has been closed. This serves to indicate that the wheel has been loosened or has worked itself loose.

Figure 4:
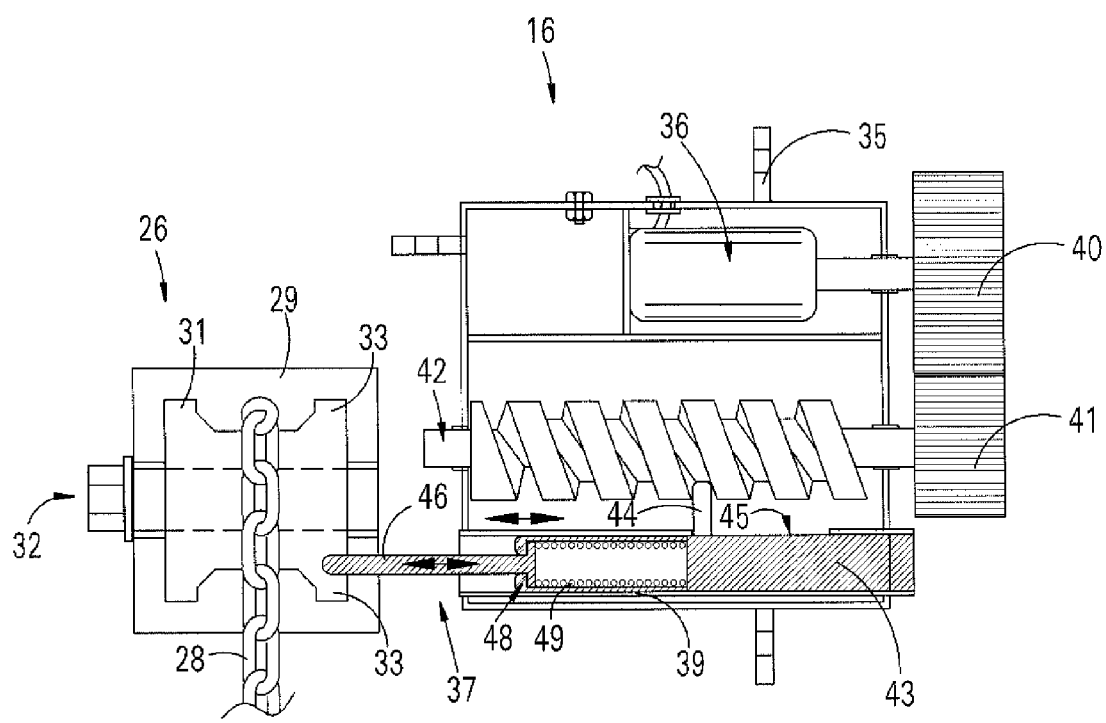
FIG. 4 shows a partial sectioned side elevation of a wheel locking mechanism in accordance with a further aspect of the invention.

FIG. 4 shows a sectional view of the spare wheel locking mechanism 16 in more detail. The locking mechanism 16 includes a housing and mounting bracket 35 whereby the mechanism 16 is mounted to the chassis of the truck, in front of the hoist 26. The mechanism 16 further includes an actuator in the form of an electrical motor 36 which is secured to the mounting bracket 35 and a locking member in the form of a spring-loaded locking pin 37 which is slideably housed within an elongate pin guide 39 which is attached to the bracket 35. An output shaft of the motor 36 is connected to a drive gear 40. The locking mechanism 16 further includes a worm gear 42 which is mounted via suitable bushes to the bracket 35 for rotation about an axis. One end of the worm gear 42 is connected to a driven gear 41 which meshes with the drive gear 40 of the motor 36. The locking pin 37 further includes a longitudinal body 43 which is slideably received within the pin guide 39. An arm 44 is connected to the body 43 and protrudes laterally away from the body 43 through a slot 45 defined in the pin guide 39 and engages the worm gear 42. The locking pin 37 further includes a spring-loaded bolt 46 which is slideably received within a hollow sleeve 48 of the body 43. The bolt 46 is held captive within the sleeve 48 due to a flanged end of the bolt 46 which engages an inner lip of an end of the sleeve 48. A coil spring 49 is held captive within the sleeve 48 and bears against the flanged end of the bolt 46 biasing the bolt 46 axially outward.

In response to an electrical control signal received from the control unit 12, the electric motor 36 is configured to displace the locking pin 37 between an open position in which the bolt 46 is retracted from the pulley block 29 such that the chain guide 31 is permitted to rotate freely and, accordingly, the spare wheel mounted to the hoist 26 can be lowered and removed from the hook 30 using the hoist spanner; and a closed or locked position (illustrated in FIGS. 3 and 4) in which the locking pin 37, and more specifically the bolt 46, extends into one of the openings 34 defined between the arms 33 of the chain guide 31 hence impeding rotation of the chain guide 31 and, accordingly, preventing lowering of the chain 28 and removal of the spare wheel from the hoist 26.

When a control signal is received by the motor 36, the motor rotates either in a forward or reverse direction depending on whether the signal is a lock or unlock signal. In the case of a lock signal being received, the motor 36 turns the drive gear 40 which in turn turns the driven gear 41 and accordingly rotates the worm gear 42. Upon rotation of the worm gear 42, the arm 44 which extends into a groove defined by the gear, meshing with the gear 42, is forced toward the left in FIG. 4. This results in displacement of the pin 37 within the pin guide 39 until the bolt 46 is in the position illustrated in FIG. 4. In the event that the bolt 46 is in register with one of the arms 33 such that it bears against one of the arms 33 instead of passing into an opening 34, the coil spring 49 will be compressed. Continued rotation of the chain guide 31 will result in the arm 33 moving out of register with the bolt 46 and accordingly, the bolt 46 will slot into the opening 34 under the bias of the spring 49. In order to unlock the locking mechanism 16, the motor 36 is driven in the opposite direction which has the effect of retracting the bolt 46 from the pulley block 29.

The alarm system 10 is armed/disarmed in conventional fashion using a wireless remote control which communicates with the remote control receiver 11. Accordingly, if the vehicle alarm system 10 is armed and any of the switches 13, 14, 15 are closed then the control unit 12 will activate the alarm and sound the siren 19. Most vehicles which have electronic central locking automatically lock/unlock all the doors of the vehicle in response to a control signal being received from the remote control. Naturally, the alarm system 10 including the spare wheel locking mechanism 16 can be configured to operate in a similar fashion. To this end, when a user activates the remote control, the control unit 12 will in response thereto forward a lock/unlock control signal to the spare wheel locking mechanism 16 which will result in displacement of the locking pin 37 between its open and closed positions. Therefore, the mechanism 16 can be configured to lock and unlock together with the conventional door lock system 17 of the vehicle.

Alternatively, the locking mechanism 16 could only be actuated/locked when the spare wheel switch 14 is closed whilst the vehicle alarm is armed. For example, if the alarm is armed and an attempt is made to remove the spare wheel, as soon as the wheel is spaced away from the wheel carrier 18 such that the switch 14 is closed, the alarm will be activated and the spare wheel locking mechanism 16 will be locked, i.e. the locking pin 37 is moved to its closed position illustrated in FIG. 4, to prevent further lowering and hence theft of the spare wheel. In addition to, or instead of arming the vehicle alarm with a remote in conventional fashion, the alarm may be armed/disarmed from inside the vehicle cabin, e.g. by way of a toggle switch. Obviously, the alarm will only sound when one of the switches 13, 14, 15 is closed whilst the alarm is armed. Therefore, if the owner would like to remove the spare wheel, he/she must first ensure that the alarm is disarmed/deactivated. It is to be appreciated that other switches such as magnetic (reed) switches may also be used instead of mechanical pressure switches to achieve the same result.

In the event that the vehicle is fitted with a rear view camera, which ordinarily assists whilst reversing or parking the vehicle, the camera may be activated when the alarm is triggered in order to give the driver a view of a rear of the vehicle where a perpetrator may be attempting to steal the spare wheel, in the case of a pickup truck. Alternatively, video footage may be recorded on a storage medium and later retrieved as evidence of the theft/attempted theft of the spare wheel. Obviously, the same principle can apply to vehicles having rear-mounted wheel carriers (not shown). The scope of the invention is therefore not limited to the example embodiment illustrated above.

A skilled person will appreciate that attempted theft or theft of a battery would also be detected by the alarm system 10 using the battery sensor 15 mounted to a battery mounting bracket (not shown).

The Inventor believes that the vehicle alarm system 10 and spare wheel locking mechanism 16 will help to alleviate the scourge of theft of externally mounted spare wheels and batteries from vehicles.

The invention claimed is:

1. A vehicle alarm system which includes:
   an electronic control unit;
   a spare wheel locking mechanism which is operatively mounted to a vehicle and which is communicatively linked to the control unit, the locking mechanism including a locking member which is configured to lock a spare wheel mounted to the vehicle in place hence preventing unauthorised removal of the spare wheel; and
   a spare wheel sensor which is communicatively linked to the control unit, the sensor being configured to detect when the spare wheel mounted to the vehicle is disengaged from the vehicle and to communicate this to the control unit, in response to which the control unit is configured to trigger an alarm and/or engage the locking member in order to lock the spare wheel in place, if need be;
   wherein the spare wheel locking mechanism further includes an actuator which is communicatively linked to the control unit and drivingly connected to the locking member, the locking member being movable between an open position in which the spare wheel is permitted to be removed from the vehicle and a closed or locked position in which the locking member prevents removal of the spare wheel from the vehicle, wherein the actuator is configured to move the locking member between its open and closed positions in response to receipt of a control signal from the control unit.

2. A vehicle alarm system as claimed in claim 1, wherein the locking member is in the form of a spring-loaded locking pin.

3. A vehicle alarm system as claimed in claim 2, wherein the actuator is in the form of an electrical motor and the locking mechanism includes a worm gear, the motor being drivingly connected to the worm gear and wherein the locking pin is at least partially held captive within a pin guide and includes a longitudinal body and an arm which extends laterally away from the body and engages the worm gear such that upon actuation of the motor, the worm gear is configured slideably to displace the locking pin relative to the pin guide from one position to another.

4. A vehicle alarm system as claimed in claim 1, which includes a battery sensor which is communicatively linked to the control unit and is operatively connected to, or connected proximate to a battery mounting bracket and/or a battery, the sensor being configured to detect whether or not the battery is mounted to the bracket and to communicate this to the control unit.

5. A vehicle alarm system as claimed in claim 3, wherein the spare wheel sensor is in the form of a mechanical pressure switch.

6. A vehicle alarm system as claimed in claim 1, which includes a rear-view camera, activation of the alarm including activation of the rear-view camera in order to provide an occupant of the vehicle with a view of the rear of the vehicle.

7. A vehicle wheel locking mechanism which is operatively mounted to a vehicle having at least one wheel externally mounted, the locking mechanism including:
an electrically operated actuator; and
a locking member which is moveable between an open position in which the wheel is permitted to be removed from a wheel mounting of the vehicle and a closed or locked position in which the locking member prevents removal of the wheel from the wheel mounting, wherein the actuator is drivingly connected to the locking member and configured to move the locking member between its open and closed positions in response to receipt of a control signal originating either from a vehicle alarm system or from a wheel sensor.

8. A vehicle wheel locking mechanism as claimed in claim 7, wherein the wheel is a spare wheel and the control signal is in the form of an electrical signal.

9. A vehicle wheel locking mechanism as claimed in claim 8, wherein the locking member is in the form of a spring-loaded locking pin which is configured to engage a spare wheel hoist, locking the hoist in position when the locking pin is in its closed position.

10. A vehicle wheel locking mechanism as claimed in claim 9, wherein the actuator is in the form of an electrical motor and the locking mechanism includes a worm gear, the motor being drivingly connected to the worm gear and wherein the locking pin is at least partially held captive within a pin guide and includes a longitudinal body and an arm which extends laterally away from the body and engages the worm gear such that upon actuation of the motor, the worm gear is configured slideably to displace the locking pin relative to the pin guide from one position to another.

11. A spare wheel hoist including:
a locking mechanism which includes:
an actuator; and
a locking member which is movable between an open position in which the hoist is permitted to raise/lower a spare wheel mounted thereto and a closed or locked position in which the locking member engages a hoisting mechanism of the hoist and prevents raising/lowering of the spare wheel, wherein the actuator is drivingly connected to the locking member and is configured to move the locking member between its open and closed positions in response to receipt of a control signal originating either from a vehicle alarm system or from a wheel sensor.

12. A spare wheel hoist as claimed in claim 11, wherein the actuator is an electrically operated actuator and the locking mechanism includes a worm gear, the actuator being drivingly connected to the worm gear and wherein the locking member is at least partially held captive within a guide and includes a longitudinal body and an arm which extends laterally away from the body and engages the worm gear such that upon actuation of the actuator, the worm gear is configured slideably to displace the locking member relative to the guide from one position to another.

13. A vehicle alarm system which includes;
an electronic control unit;
a spare wheel locking mechanism which is operatively mounted to a vehicle and which is communicatively linked to the control unit, the locking mechanism including a locking member which is configured to lock a spare wheel mounted to the vehicle in place hence preventing unauthorised removal of the spare wheel; and
a spare wheel sensor which is communicatively linked to the control unit, the sensor being configured to detect when the spare wheel mounted to the vehicle is disengaged from the vehicle and to communicate this to the control unit, in response to which the control unit is configured to trigger an alarm and/or engage the locking member in order to lock the spare wheel in place, if need be;
a battery sensor which is communicatively linked to the control unit and is operatively connected to, or connected proximate to a battery mounting bracket and/or a battery, the sensor being configured to detect whether or not the battery is mounted to the bracket and to communicate this to the control unit.

14. A vehicle alarm system as claimed in claim 13, wherein the spare wheel locking mechanism further includes:
an actuator which is communicatively linked to the control unit and drivingly connected to the locking member, the locking member being movable between an open position in which the spare wheel is permitted to be removed from the vehicle and a closed or locked position in which the locking member prevents removal of the spare wheel from the vehicle, wherein the actuator is configured to move the locking member between its open and closed positions in response to receipt of a control signal from the control unit.

15. A vehicle alarm system as claimed in claim 14, wherein the locking member is in the form of a spring-loaded locking pin.

16. A vehicle alarm system as claimed in claim 15, wherein the actuator is in the form of an electrical motor and the locking mechanism includes a worm gear, the motor being, drivingly connected to the worm gear and wherein the locking pin is at least partially held captive within a pin guide and includes a longitudinal body and an arm which extends laterally away from the body and engages the worm gear such that upon actuation of the motor, the worm gear is configured slideably to displace the locking pin relative to the pin guide from one position to another.

17. A vehicle alarm system as claimed in claim 13, wherein the spare wheel sensor is in the form of a mechanical pressure switch.

* * * * *

UNITED STATES PATENT AND TRADEMARK OFFICE
CERTIFICATE OF CORRECTION

PATENT NO.        : 9,487,185 B2
APPLICATION NO.   : 14/631000
DATED             : November 8, 2016
INVENTOR(S)       : Philippus Petrus Erasmus Taljaard Page 1 of 1

It is certified that error appears in the above-identified patent and that said Letters Patent is hereby corrected as shown below:

In the Claims

At Column 6, Claim number 1, Line number 55, the word "dosed" should be replaced with the word "closed".

Signed and Sealed this
Fourteenth Day of March, 2017

Michelle K. Lee
*Director of the United States Patent and Trademark Office*